US009989094B2

(12) United States Patent
Yamada

(10) Patent No.: US 9,989,094 B2
(45) Date of Patent: Jun. 5, 2018

(54) WHEEL BEARING APPARATUS

(71) Applicant: NTN Corporation, Osaka-shi (JP)

(72) Inventor: Tomoya Yamada, Iwata (JP)

(73) Assignee: NTN Corporation, Osaka-shi (JP)

( * ) Notice: Subject to any disclaimer, the term of this patent is extended or adjusted under 35 U.S.C. 154(b) by 51 days.

(21) Appl. No.: 15/261,888

(22) Filed: Sep. 10, 2016

(65) Prior Publication Data

US 2017/0067509 A1 Mar. 9, 2017

Related U.S. Application Data

(63) Continuation of application No. PCT/JP2015/057203, filed on Mar. 11, 2015.

(30) Foreign Application Priority Data

Mar. 12, 2014 (JP) .................................. 2014-048278

(51) Int. Cl.
F16C 19/18 (2006.01)
F16C 33/76 (2006.01)
F16C 33/72 (2006.01)
F16C 33/78 (2006.01)
F16C 41/00 (2006.01)
(Continued)

(52) U.S. Cl.
CPC .......... F16C 33/723 (2013.01); B60B 7/0013 (2013.01); B60B 27/0005 (2013.01); F16C 19/186 (2013.01); F16C 33/768 (2013.01); F16C 33/783 (2013.01); F16C 41/007 (2013.01); B60B 27/00 (2013.01); B60B 27/02 (2013.01); B60B 2380/12 (2013.01); B60B 2380/73 (2013.01); B60B 2900/211 (2013.01); B60B 2900/5112 (2013.01);
(Continued)

(58) Field of Classification Search
CPC .. F16C 19/186; F16C 33/723; F16C 2326/02; F16C 41/007
See application file for complete search history.

(56) References Cited

U.S. PATENT DOCUMENTS 8,585,298 B2 * 11/2013 Komori ............... B60B 27/0005
384/448
2010/0066029 A1 3/2010 Kobayashi et al.
(Continued)

FOREIGN PATENT DOCUMENTS

EP 2 685 117 A1 1/2014
JP H02-13021 9/1990
(Continued)

Primary Examiner — Phillip A Johnson
(74) Attorney, Agent, or Firm — Harness, Dickey & Pierce, P.L.C.

(57) ABSTRACT

A wheel bearing apparatus has an outer member, an inner member, and double row rolling elements contained between the outer raceway surfaces and inner raceway surfaces of the outer member and the inner member. A cup-shaped steel protective cover is mounted on the inner-side end of the outer member. The cover fitting portion has a cylindrical portion, a radially reduced portion and an elastic member. The elastic member has an annular projection and a contact lip. When the protective cover is fit into the outer member, the annular projection closely contacts with the fitting surface while elastically deforming and the contact lip elastically contacts the inner-side end of the outer member.

9 Claims, 11 Drawing Sheets

(51) Int. Cl.
 *B60B 7/00* (2006.01)
 *B60B 27/00* (2006.01)
 *B60B 27/02* (2006.01)

(52) U.S. Cl.
 CPC ... *B60B 2900/5118* (2013.01); *F16C 2233/00* (2013.01); *F16C 2326/02* (2013.01)

(56) References Cited

U.S. PATENT DOCUMENTS

2011/0254356 A1* 10/2011 Yamamoto .......... B60B 27/0005
 301/109
2012/0177312 A1 7/2012 Aritake et al.
2013/0195389 A1* 8/2013 Seki .................... F16C 33/723
 384/446

FOREIGN PATENT DOCUMENTS

| JP | 2008-281013 | 11/2008 | |
|----|----|----|----|
| JP | 2010190421 A * | 9/2010 | ............ F16C 33/723 |
| JP | 2012-202415 | 10/2012 | |
| JP | 2012-232708 | 11/2012 | |
| JP | 2013164114 A * | 8/2013 | ............ F16C 33/726 |
| WO | WO2011/034134 | 3/2011 | |
| WO | WO-2011115252 A1 * | 9/2011 | ......... B60B 27/0005 |

* cited by examiner

D1<D2

D1<D2

D1<D2

D1<D2

D3<D4

H2<H3

H2<H3

D5<D6
H2<H3

WHEEL BEARING APPARATUS

CROSS-REFERENCE TO RELATED APPLICATIONS

This application is a continuation of International Application No. PCT/JP2015/057203, filed Mar. 11, 2015, which claims priority to Japanese Application No. 2014-048278, filed Mar. 12, 2014. The disclosures of the above applications are incorporating herein by reference.

FIELD

The present disclosure relates to a wheel bearing apparatus that rotationally supports a wheel of a vehicle, such as an automobile, relative to a suspension apparatus. More particularly, it relates to a wheel bearing apparatus with a protective cover on an outer member of the wheel bearing that prevents leakage of grease sealed within the wheel bearing. Also, it prevents entry of foreign matter into the wheel bearing. Further, it has a rotation speed detecting sensor to detect a rotational speed of a wheel.

BACKGROUND

It is generally known that a rotation speed sensor built-in type wheel bearing apparatus rotationally supports a wheel of a vehicle with respect to a suspension apparatus, controls an anti-lock braking system (ABS) and detects a rotational speed of a wheel. Such a bearing apparatus generally includes a sealing apparatus arranged between inner and outer members rotating relative to each other via rolling elements, a magnetic encoder integrated with the sealing apparatus (having magnetic poles alternately arranged along its circumference) and a rotation speed sensor to detect change of magnetic poles of the magnetic encoder.

Generally, the rotation speed sensor is mounted on a knuckle that forms part of the suspension apparatus after the wheel bearing apparatus is mounted on the knuckle. A wheel bearing apparatus with a rotation speed detecting apparatus of the built-in type, that is compact and can simplify complexity of an air gap adjusting operation between the rotation speed sensor and the magnetic encoder, has been recently proposed.

A structure shown in FIG. 12 is known as one example of a wheel bearing apparatus of the rotational speed detecting apparatus built-in type. This wheel bearing apparatus includes seals (not shown) arranged between an outer member 51 and an inner ring 52. A protective cover 53 prevents leakage of grease sealed within the wheel bearing and entry of foreign matter into the wheel bearing.

A pulser ring 54 is press-fit onto the outer circumference of the inner ring 52. The pulser ring 54 has a supporting member 55 and a magnetic encoder 56. The supporting member 55 is press-formed from steel sheet as an annulus with an L-shaped cross-section. The magnetic encoder 56 integrally adhered to the supporting member 55. The supporting member 55 has a cylindrical fitting portion 55a press-fit onto the outer circumference of the inner ring 52. An upright portion 55b extends radially outward from the fitting portion 55a. The magnetic encoder 56 is integrally adhered to the upright portion 55b, via vulcanizing adhesion.

The protective cover 53 is press-fit into the inner circumference of the outer member 51 to close an opening of the outer member 51. The protective cover 53 is press-formed from austenitic stainless steel sheet with a substantially flanged disc-shaped configuration. It has a cylindrical fitting portion 53a adapted to be press-fit into the inner circumference of the outer member 51. A disc-shaped shield portion 53b radially inwardly extends from the fitting portion 53a. The disc-shaped shield portion 53b opposes the magnetic encoder 56 via a small axial gap. A bottom portion 53d (FIG. 13) extends from the shield portion 53b via a bent portion 53c.

The detection portion of the rotation speed sensor 57 is arranged opposite to the protective cover 53 close to or in contact with the shield portion 53b. The detection portion and the magnetic encoder 56 oppose each other via the protective cover 53 with a predetermined air gap therebetween. The fitting portion 53a of the protective cover 53 has a cylindrical portion 58 adapted to be metal-contact fit into a fitting surface 51a formed on the inner circumference of the end of the outer member 51. A radially reduced cylindrical portion 59 axially extends from the cylindrical portion 58. In addition, an elastic member 60, of synthetic rubber, is integrally adhered to the radially reduced portion 59 via vulcanizing adhesion. The elastic member 60 is adhered to the radially reduced portion 59 so that it does not interfere with the rotation speed sensor 57 projecting from the side-face of the shield portion 53b of the protective cover 53. In addition, the elastic member 60 has an annular projection 60a projecting radially outward from the outer circumference of the cylindrical portion 58. The annular projection 60a is press-contacted against the inner circumference of the end of the outer member 51 during fitting of the protective cover 53. This improves sealability.

These protective covers 53 are usually stacked upon each other to save storage space and stocked to await the next manufacturing step as shown in FIG. 13(a). In this case, in order to prevent the stacked protective covers 53 from being fit in each other before the elastic members 60 are vulcanizing adhered to the protective covers 53, an inner diameter d1 (FIG. 12) of the cylindrical portion 58 of the fitting portion 53a is set smaller than an outer diameter d2 of the radially reduced portion 59 (d1<d2). This also makes it possible to prevent the "fitting in" of the protective covers 53 even after vulcanizing adhesion of the elastic members 60 as shown in FIG. 13(b). Thus, this further improves the workability during manufacture of the protective covers 53 (see, JP 2012-202415 A).

In the wheel bearing apparatus, an elastic member 60 of synthetic resin is integrally adhered to the radially reduced portion 59. It has an annular projection 60a projecting radially outward from the outer circumference of the cylindrical portion 58 of the fitting portion 53a. The annular projection 60a is elastically deformed and press-contacted against the inner circumference of the outer member 51. The protective cover 53 is fit into the outer member 51. Thus, it is possible to improve the sealability of the fitting portion 53a. However, it is a problem of the protective cover 53 that the elastic member 60 is pushed out toward the inner-side and it bulges out from the end face of the outer member 51 when the protective cover 53 is press-fit into the outer member 51. Accordingly, the sealability is impaired. In order to solve this problem, an elastic member has been developed that is integrally formed with a lip that elastically contacts against the inner circumference of the end of the outer member 51. However, another problem is caused in that the newly developed elastic member would sometimes be damaged or cut by metallic portions of the protective cover when the protective covers are stacked upon each other during the manufacturing steps of the protective covers.

SUMMARY

It is, therefore, an object of the present disclosure to provide a wheel bearing apparatus to solve the above described problems of prior art. Thus, it would improve the workability during a press-fitting operation and the sealability in the fitting section as well as workability during the manufacturing steps. Accordingly, this increases the reliability in quality of the wheel bearing apparatus.

To achieve the objects mentioned above, a wheel bearing apparatus comprises an outer member integrally formed on its inner circumference with double row outer raceway surfaces. An inner member includes a wheel hub and at least one inner ring. The wheel hub is integrally formed on its one end with a wheel mounting flange. A cylindrical portion axially extends from the wheel mounting flange. The inner ring is press fit onto the cylindrical portion of the wheel hub. The inner member is formed on its outer circumferences with double row inner raceway surfaces that oppose the double row outer raceway surfaces. Double row rolling elements are contained between the outer raceway surfaces and inner raceway surfaces, respectively, of the outer member and the inner member. A cup-shaped steel protective cover is mounted on the inner-side end of the outer member. The protective cover comprises a cylindrical fitting portion adapted to be press-fit into the inner circumference of the inner-side end of the outer member. A disc-shaped shield portion extends radially inward from the fitting portion. A bottom portion extends from the shield portion, via a bent portion, to cover the inner-side end of the inner member. The fitting portion of the protective cover comprises a cylindrical portion adapted to be metal-contact fit into a cylindrical fitting surface formed on the inner circumference of the end of the outer member. A radially reduced portion axially extends from the cylindrical portion. An elastic member, of synthetic rubber, is integrally adhered to the radially reduced portion, via vulcanizing adhesion. The elastic member comprises an annular projection radially outwardly projecting from the outer circumference of the cylindrical portion. A contact lip radially outwardly extends, with an inclination, at the inner-side of the annular projection. When the protective cover is fit into the outer member, the annular projection closely contacts the fitting surface while being elastically deformed. The contact lip elastically contacts the inner-side end of the outer member.

A cup-shaped steel protective cover is mounted on the inner-side end of the outer member. The protective cover comprises a cylindrical fitting portion, a disc-shaped shield portion and bottom. The cylindrical fitting portion is press-fit into the inner circumference of the inner-side end of the outer member. The disc-shaped shield portion extends radially inward from the fitting portion. The bottom portion extends from the shield portion, via a bent portion, to cover the inner-side end of the inner member. The fitting portion of the protective cover comprises a cylindrical portion and a radial portion. The cylindrical portion is metal-contact fit into a cylindrical fitting surface formed on the inner circumference of the end of the outer member. The radially reduced portion axially extends from the cylindrical portion. An elastic member, of synthetic rubber, is integrally adhered to the radially reduced portion, via vulcanizing adhesion. The elastic member comprises an annular projection and a contact lip. The annular projection projects radially outwardly from the outer circumference of the cylindrical portion. The contact lip radially outwardly extends, with an inclination, at the inner-side of the annular projection. When the protective cover is fit into the outer member, the annular projection closely contacts the fitting surface while being elastically deformed. The contact lip elastically contacts the inner-side end of the outer member. Thus, it is possible to improve the workability during the press-fitting operation and prevent the elastic member from being pushed-out toward the inner-side and bulged out from the end face of the outer member. Thus, this improves the sealability of the fitting portion of the protective cover.

A pulser ring, with its magnetic characteristics alternately changing along its circumferential direction, is fit onto the inner ring. The protective cover is formed of non-metallic steel sheet. A rotational speed sensor is arranged opposite to the pulser ring while being separated by an axial air gap, via the protective cover. Thus, it is possible to set the air gap small and improve the detection accuracy.

An outer diameter of a tip end of the cylindrical portion of the protective cover is set smaller than an outer diameter of a tip end of the contact lip of the elastic member. Thus, it is possible to provide a wheel bearing apparatus that prevents the contact lip of a lower stacked protective cover from being damaged or cut by the tip end of the cylindrical portion of an upper stacked protective cover. This occurs when the protective covers are stacked upon each other during transfer between manufacturing steps. Thus, this improves the workability in manufacturing and transferring steps as well as reliability of quality.

A chamfered portion, with an inclined flat surface, is formed on a tip end of the cylindrical portion of the protective cover. An inclination angle of the chamfered portion corresponds to that of the contact lip. This makes it possible to easily press-fit the protective cover into to the outer member. This improves the stability in the stacked state and the workability during manufacture of the protective cover.

A chamfered portion, with a circular arc surface, is formed on a tip end of the cylindrical portion of the protective cover. This makes it possible to easily press-fit the protective cover into to the outer member. This prevents the contact lip from being damaged and cut during stacking.

A bent edge, bent radially inward, is formed on a tip end of the cylindrical portion of the protective cover. This makes it possible to easily press-fit the protective cover into the outer member. Also, it prevents the contact lip from being damaged and cut.

A cylindrical guide portion is integrally formed on the elastic member radially inward of the contact lip. An outer diameter of the guide portion is set smaller than an inner diameter of the cylindrical portion of the protective cover with a remaining guiding gap between the two. This improves the stability of the stacked state of the protective covers and the workability during their manufacture. This is due to the cylindrical portion of the upper protective cover being radially guided by the guide portion of the lower protective cover.

The bent portion is formed at a right angle relative to the shield portion. The protective cover is formed with configurations and dimensions so that metallic portions of mutually adjacent protective covers contact each other before the cylindrical portions abut against the elastic members when the protective covers are stacked on each other. This prevents the metallic fitting portion from contacting the elastic member. Also, it prevents the contact lip from being damaged and cut during stacking. The corner between the bent portion and shield portion of the upper protective cover abuts against the corner between the bottom portion and the bent portion of the lower protective cover.

The protective cover comprises a smaller cylindrical portion that axially extends from the bent portion via a taper-shaped stepped portion. It has a diameter smaller than that of the bent portion. This prevents the elastic member from contacting the metallic cylindrical portion of the protective cover. Thus, it prevents damage and cutting and, accordingly to further improves the stability and workability due to the surface contact between the fit protective covers are stacked upon each other. The corner between the bent portion and the shield portion of the upper protective cover abuts against the stepped portion of the lower protective cover before the cylindrical portion of the metallic portion contacts against the elastic member.

The wheel bearing apparatus of the present disclosure comprises an outer member integrally formed on its inner circumference with double row outer raceway surfaces. An inner member includes a wheel hub and at least one inner ring. The wheel hub is integrally formed on its one end with a wheel mounting flange. A cylindrical portion axially extends from the wheel mounting flange. The inner ring is press fit onto the cylindrical portion of the wheel hub. The inner member is formed on its outer circumferences with double row inner raceway surfaces opposing the double row outer raceway surfaces. Double row rolling elements are contained between the outer raceway surfaces and inner raceway surfaces, respectively, of the outer member and the inner member. A cup-shaped steel protective cover is mounted on the inner-side end of the outer member. The protective cover comprises a cylindrical fitting portion, a disc-shaped shield portion and a bottom portion. The cylinder fitting portion is press-fit into the inner circumference of the inner-side end of the outer member. The disc-shaped shield portion extends radially inward from the fitting portion. The bottom portion extends from the shield portion, via a bent portion, to cover the inner-side end of the inner member. The fitting portion of the protective cover comprises a cylindrical portion and radially reduced portion. The cylindrical portion is metal-contact fit into a cylindrical fitting surface formed on the inner circumference of the end of the outer member. The radially reduced portion axially extends from the cylindrical portion. An elastic member, of synthetic rubber, is integrally adhered to the radially reduced portion, via vulcanizing adhesion. The elastic member comprises an annular projection and a contact lip. The annular projection projects radially outwardly from the outer circumference of the cylindrical portion. The contact lip radially outwardly extends, with an inclination, at the inner-side of the annular projection. When the protective cover is fit into the outer member, the annular projection closely contacts with the fitting surface while being elastically deformed. The contact lip elastically contacts the inner-side end of the outer member. This improves the press-fitting ability of the protective cover into the outer member. It prevents the elastic member from being pushed out toward the inner-side of the bearing apparatus and from being bulged out from the end face of the outer member. This improves the sealability of the fitting portion of the protective cover.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

A wheel bearing apparatus comprises an outer member with an integrally formed body mounting flange on its outer circumference. The flange is mounted on a knuckle. The outer member has inner circumferential double row outer raceway surfaces. An inner member includes a wheel hub and an inner ring. The wheel hub is integrally formed on its one end with a wheel mounting flange. A cylindrical portion axially extends from the wheel mounting flange. The inner ring is press fit onto the cylindrical portion of the wheel hub. The wheel hub and the inner ring include outer circumferences, respectively, with double row inner raceway surfaces opposite to the double row outer raceway surfaces. Double row rolling elements are contained between the inner raceway surfaces and outer raceway surfaces of the inner member and outer member. A pulser ring is fit onto the outer circumference of the inner ring. The pulser ring has circumferentially and equidistantly changing magnetic characteristics. A cup-shaped steel protective cover, formed of non-magnetic steel sheet, is mounted on the inner-side end of the outer member. The protective cover comprises a cylindrical fitting portion, a disk-shaped shield portion and a bottom portion. The cylindrical portion is press-fit into the inner circumference of the inner-side end of the outer member. The disc-shaped shield portion extends radially inward from the fitting portion. The bottom portion extends from the shield portion, via a bent portion, to cover the inner-side end of the inner member. A rotation speed sensor is arranged opposite to the pulser ring, with a predetermined axial air gap, via the protective cover. The fitting portion of the protective cover comprises a cylindrical portion and a radially reduced portion. The cylindrical portion is in a metal-contact fit with a cylindrical fitting surface formed on the inner circumference of the end of the outer member. The radially reduced portion axially extends from the cylindrical portion. An elastic member, of synthetic rubber, is integrally adhered to the radially reduced portion via vulcanizing adhesion. The elastic member comprises an annular projection and a contact lip. The annular projection projects radially outwardly from the outer circumference of the cylindrical portion. The contact lip radially outwardly extends, with an inclination, at the inner-side of the annular projection. When the protective cover is fit into the outer member, the annular projection closely contacts the fitting surface while being elastically deformed. The contact lip elastically contacts the inner-side end of the outer member. An outer diameter of a tip end of the cylindrical portion of the protective cover is set smaller than an outer diameter of a tip end of the contact lip of the elastic member.

Figure 1:
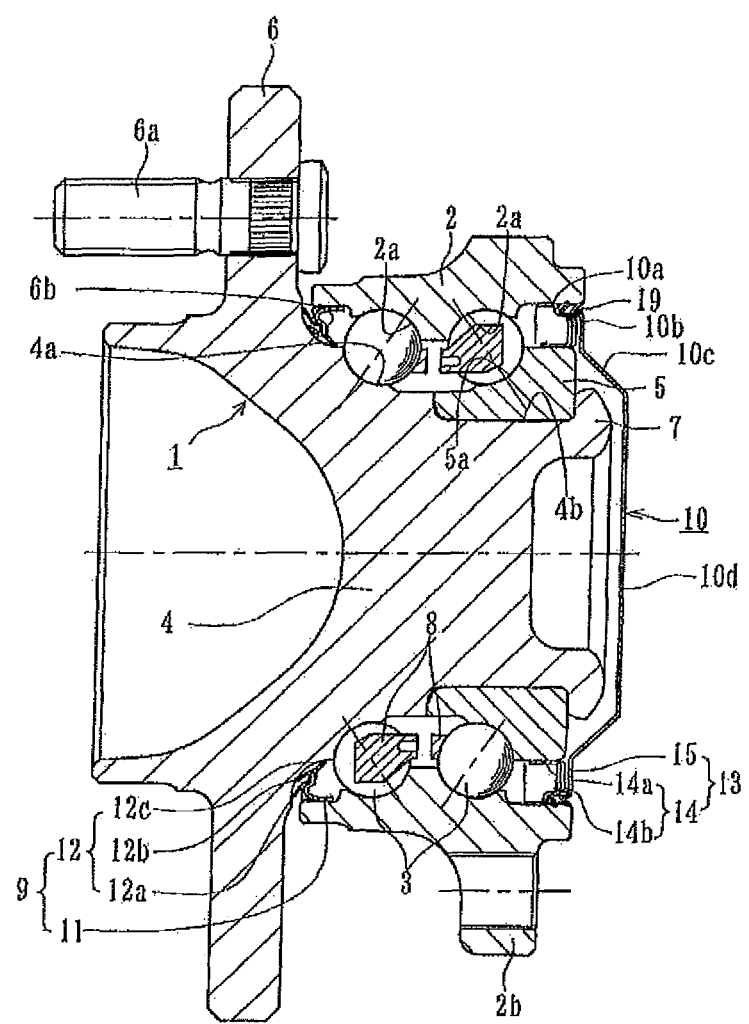
FIG. 1 is a longitudinal-sectional view of a first embodiment of a wheel bearing apparatus.
Figure 2:
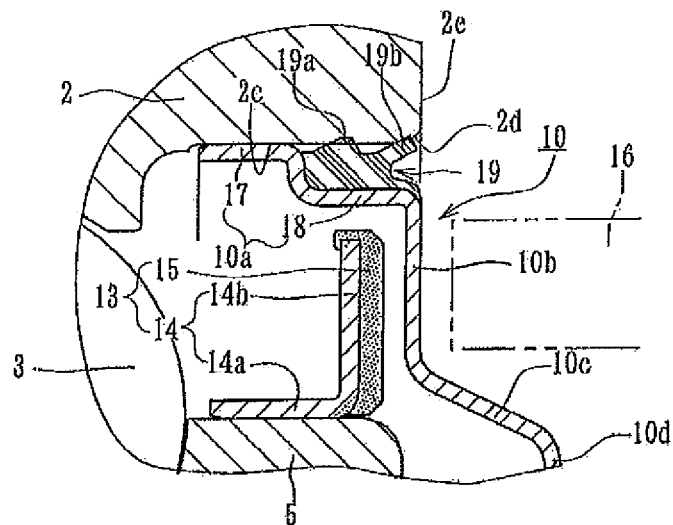
FIG. 2 is a partially enlarged view of a detection portion of FIG. 1.
Figure 3A:
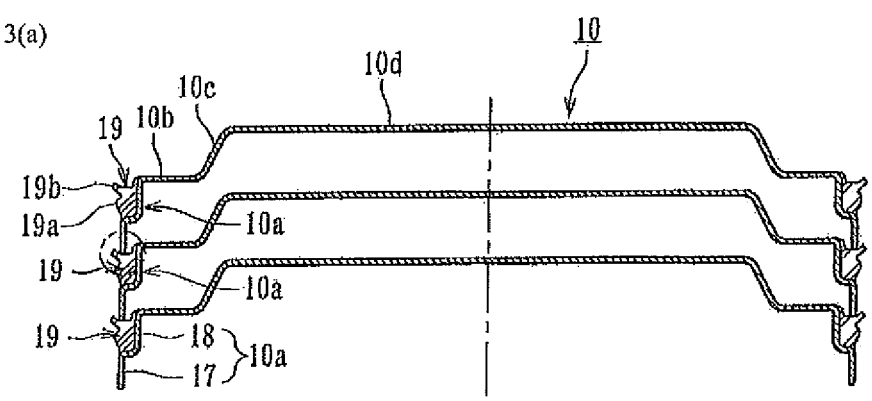
FIG. 3(a) is an explanatory view of a stacked state of the protective covers of FIG. 2.
Figure 3B:
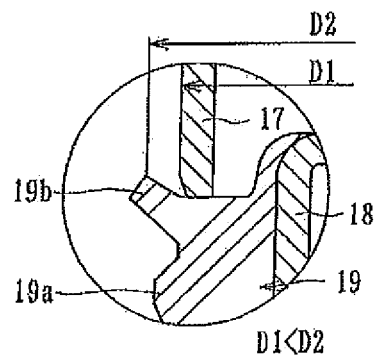
FIG. 3(b) is an enlarged view of FIG. 3(a).
Figure 3C:
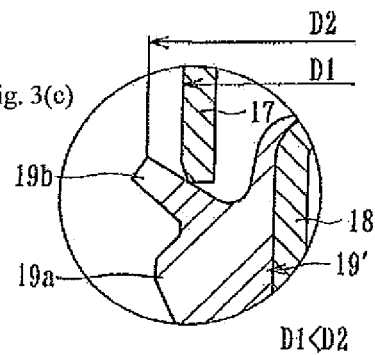
FIG. 3(c) is an enlarged view of a modification of the elastic member of FIG. 3(b).
Figure 4A:
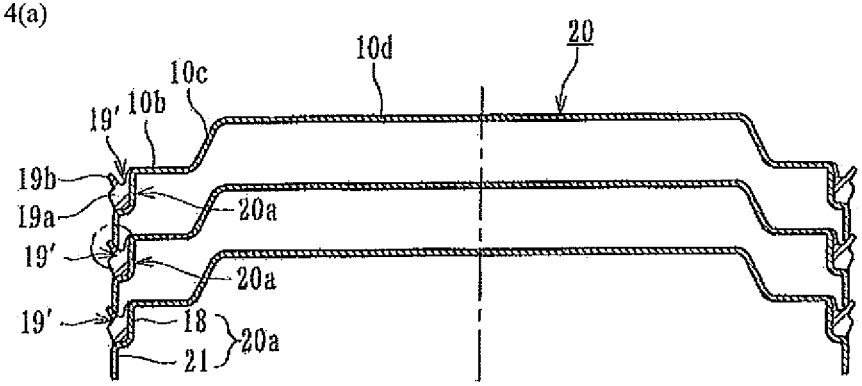
FIG. 4(a) is an explanatory view of a stacked state of a modification protective covers of FIG. 2.
Figure 4B:
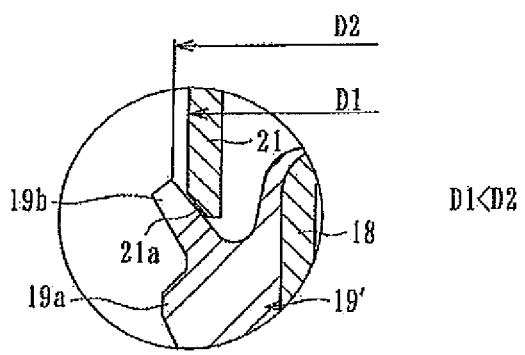
FIG. 4(b) is an enlarged view of FIG. 4(a).
Figure 5A:
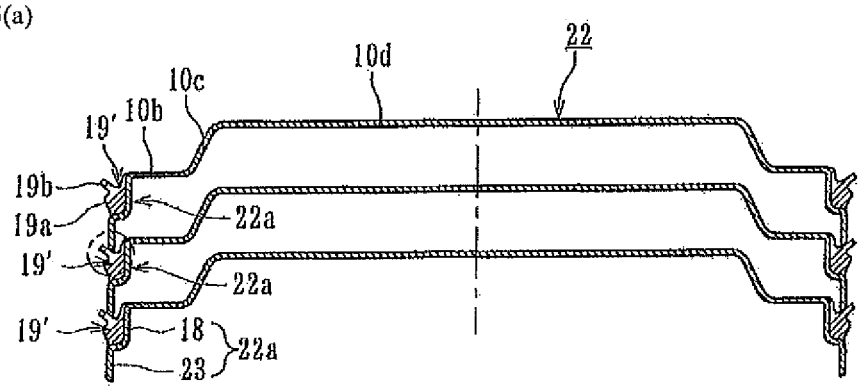
FIG. 5(a) is an explanatory view of a stacked state of a modification of the protective covers of FIG. 2.
Figure 5B:
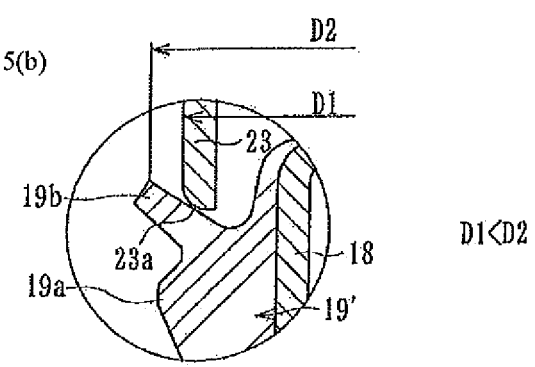
FIG. 5(b) is an enlarged view of FIG. 5(a).
Figure 6A:
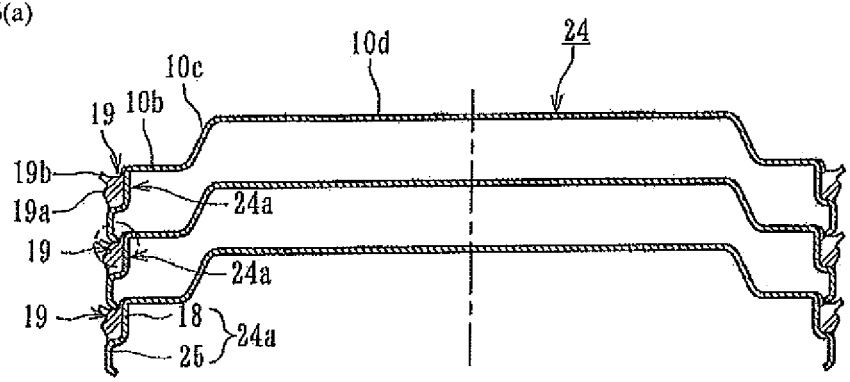
FIG. 6(a) is an explanatory view of a stacked state of a modification of the protective covers of FIG. 2.
Figure 6B:
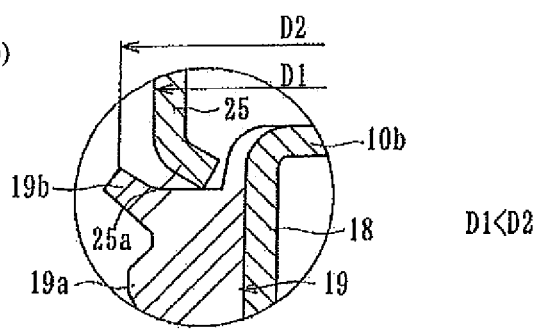
FIG. 6(b) is an enlarged view of FIG. 6(a).
Figure 7A:
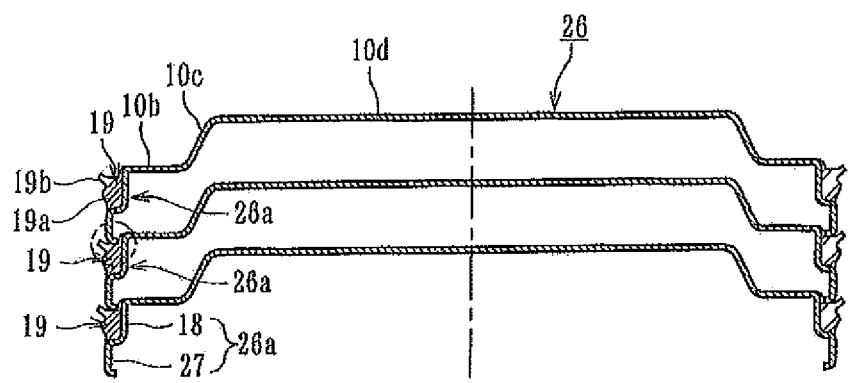
FIG. 7(a) is an explanatory view of a stacked state of another modification of the protective covers of FIG. 2.
Figure 7B:
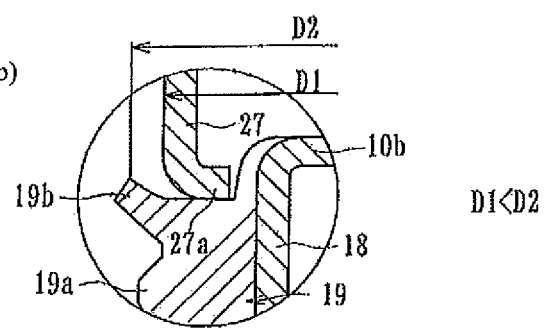
FIG. 7(b) is an enlarged view of FIG. 7(a).
Figure 8A:
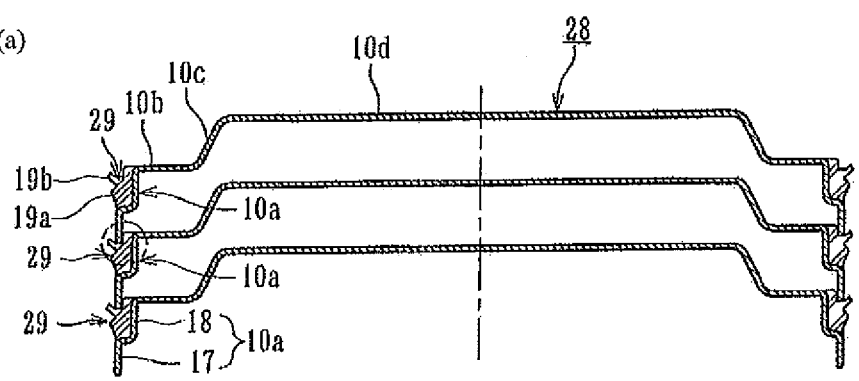
FIG. 8(a) is an explanatory view of a stacked state of another modification of the protective covers of FIG. 2.
Figure 8B:
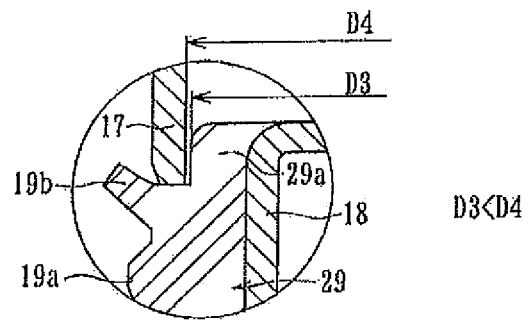
FIG. 8(b) is an enlarged view of FIG. 8(a).
Figure 9A:
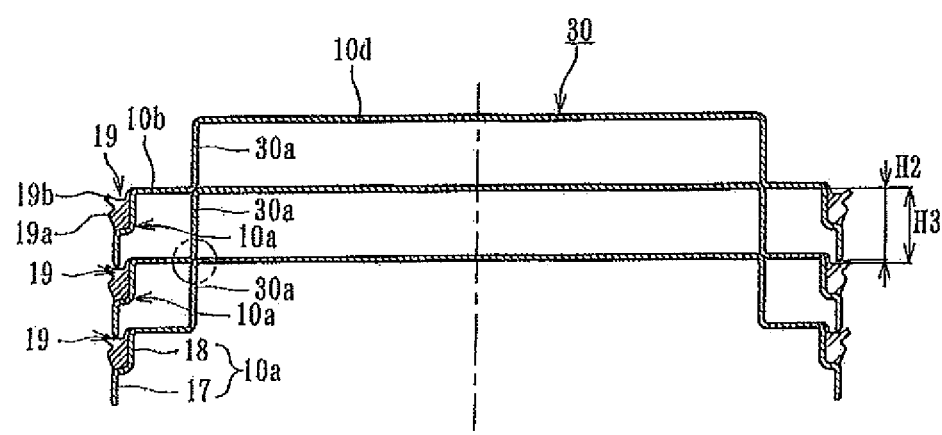
FIG. 9(a) is an explanatory view of a stacked state of another modification of the protective covers of FIG. 2.
Figure 9B:
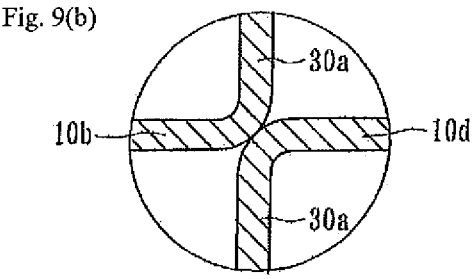
FIG. 9(b) is an enlarged view of FIG. 9(a).
Figure 10A:
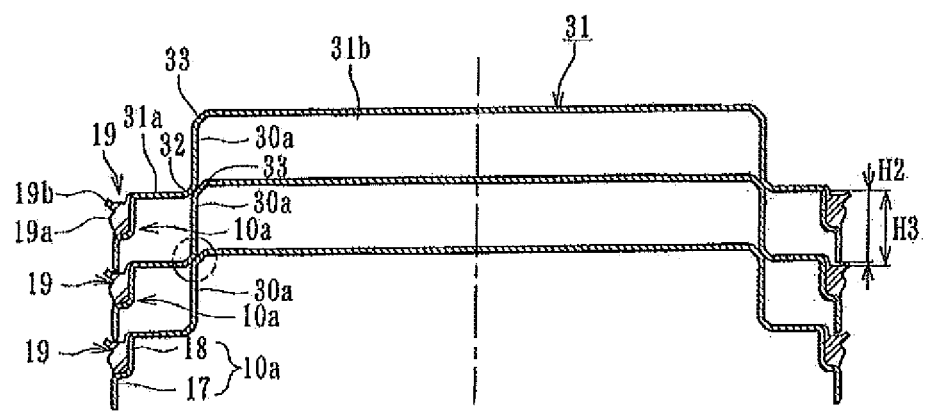
FIG. 10(a) is an explanatory view of a stacked state of another modification of the protective covers of FIG. 9.
Figure 10B:
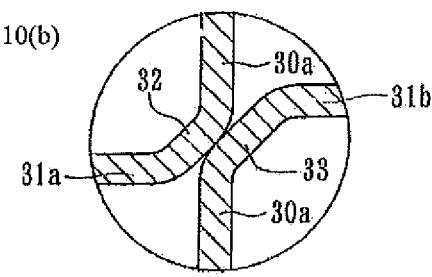
FIG. 10(b) is an enlarged view of FIG. 10(a).
Figure 11A:
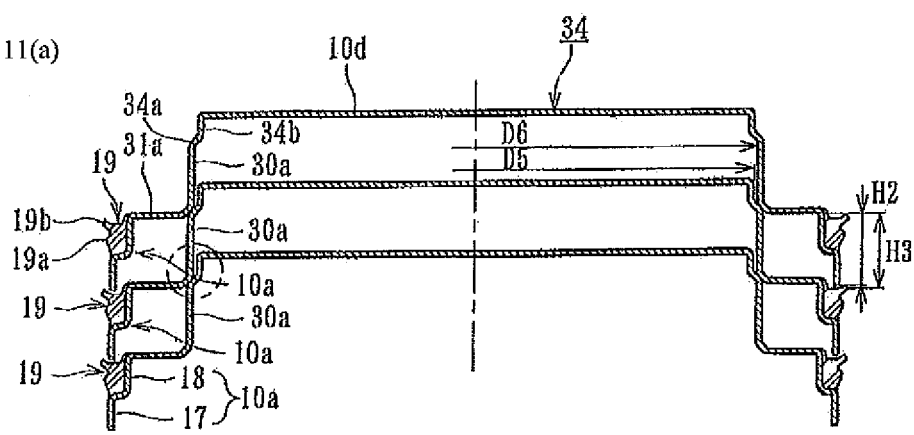
FIG. 11(a) is an explanatory view of a stacked state of another modification of the protective covers of FIG. 9.
Figure 11B:
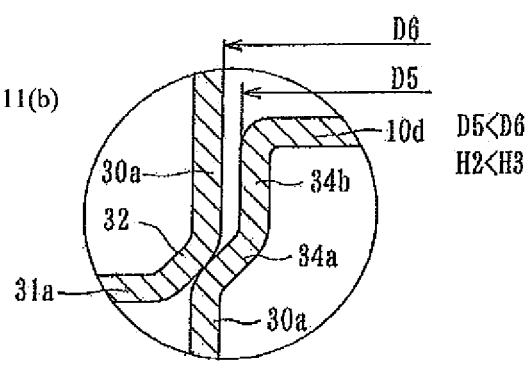
FIG. 11(b) is an enlarged view of FIG. 11(a).
Figure 12:
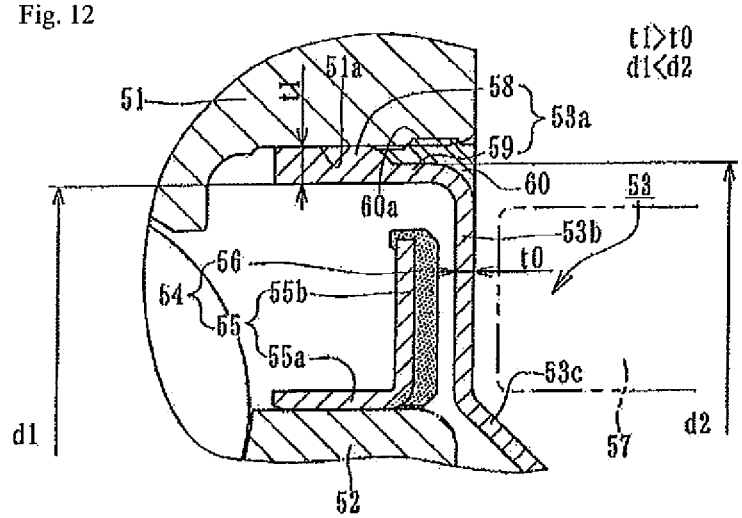
FIG. 12 is an enlarged view of a prior art mounted portion of a protective cover of a wheel bearing apparatus.
Figure 13A:
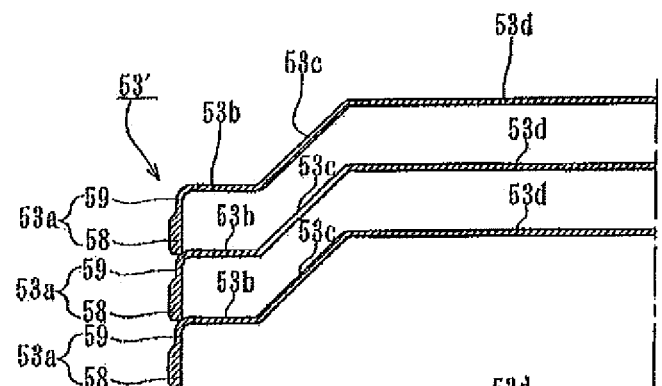
FIG. 13(a) is an explanatory view of a stacked state of protective covers of FIG. 12 before vulcanizing adhesion.
Figure 13B:
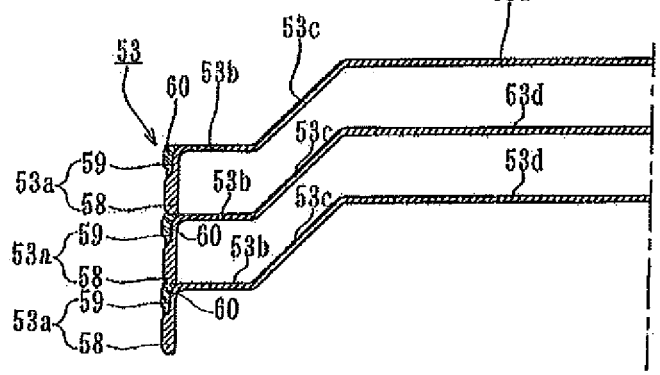
FIG. 13(b) is an explanatory view of a stacked state of protective covers of FIG. 12 after vulcanizing adhesion.

Preferred embodiments of the present disclosure will be described with reference to the accompanied drawings. FIG. 1 is a longitudinal-sectional view of one embodiment of a wheel bearing apparatus. FIG. 2 is a partially enlarged view of a detection portion of FIG. 1. FIG. 3(a) is an explanatory view of a stacked state of the protective covers of FIG. 2. FIG. 3(b) is an enlarged view of FIG. 3(a). FIG. 3(c) is an enlarged view of a modification of the elastic member of FIG. 3(b). FIG. 4(a) is an explanatory view of a stacked state of modified protective covers of FIG. 2. FIG. 4(b) is an enlarged view of FIG. 4(a). FIG. 5(a) is an explanatory view of a stacked state of modified protective covers of FIG. 2. FIG. 5(b) is an enlarged view of FIG. 5(a). FIG. 6(a) is an explanatory view of a stacked state of modified protective covers of FIG. 2. FIG. 6(b) is an enlarged view of FIG. 6(a). FIG. 7(a) is an explanatory view of a stacked state of modified protective covers of FIG. 2. FIG. 7(b) is an enlarged view of FIG. 7(a). FIG. 8(a) is an explanatory view of a stacked state of modified protective covers of FIG. 2. FIG. 8(b) is an enlarged view of FIG. 8(a). FIG. 9(a) is an explanatory view of a stacked state of modified protective covers of FIG. 2. FIG. 9(b) is an enlarged view of FIG. 9(a). FIG. 10(a) is an explanatory view of a stacked state of modified protective covers of FIG. 9. FIG. 10(b) is an enlarged view of FIG. 10(a). FIG. 11(a) is an explanatory view of a stacked state of modified protective covers of FIG. 9. FIG. 11(b) is an enlarged view of FIG. 11(a).

In the description of the specification, an outer-side of a bearing apparatus, when it is mounted on a vehicle, is referred to as "outer-side" (a left side in a drawing). An inner-side of a bearing apparatus, when it is mounted on a vehicle, is referred to as "inner side" (a right side in a drawing).

The wheel bearing apparatus shown in FIG. 1 is a so-called "third generation" type for a driven wheel. It includes an inner member 1, an outer member 2, and double row rolling elements (balls) 3, 3 contained between the inner and outer members 1 and 2. The inner member 1 includes the wheel hub 4 and an inner ring 5. The inner ring 5 is press-fit onto the wheel hub 4, via a predetermined interference.

The wheel hub 4 is integrally formed, on its outer-side end, with a wheel mounting flange 6. The flange 6 mounts a wheel (not shown). The outer circumference of the wheel hub has one (outer-side) inner raceway surface 4a. A cylindrical portion 4b axially extends from the raceway surface 4a. Hub bolts 6a are secured on the wheel mounting flange 6 at circumferentially equidistant positions.

The inner ring 5 is formed with the other (inner-side) inner raceway surface 5a on its outer circumference. The inner ring 5 is press-fit onto the cylindrical portion 4b of the wheel hub 4, via a predetermined interference, to form a so-called back-to-back duplex bearing. In addition, the inner ring 5 is axially secured on the wheel hub 4, with an applied predetermined bearing pre-pressure, by a caulked portion 7. The caulked portion 7 is formed by plastically deforming radially outwardly the end of the cylindrical portion 4b of the wheel hub 4.

The wheel hub 4 is made of medium-high carbon steel such as S53C including carbon of 0.40~0.80% by weight. It is hardened by high frequency induction hardening to have a surface hardness of 58~64 HRC over the inner raceway surface 4a and a region from an inner-side base 6b of the wheel mounting flange 6 to the cylindrical portion 4b. The caulked portion 7 is not hardened to keep its hardness after forging less than 25 HRC. This enables an increased mechanical strength against the rotary bending load applied to the wheel mounting flange 6. It improves the anti-fretting strength of the cylindrical portion 4b, which the inner ring 5 is press-fit. The plastic deforming of the caulked portion 7 is smoothly performed without causing micro cracking.

The inner ring 5 is formed of high carbon chrome steel such as SUJ2. It is dip hardened to its core to have a hardness of 58~64 HRC. The rolling elements 3 are formed of high carbon chrome steel such as SUJ2 and hardened to a hardness of 62~67 HRC.

The outer member 2 is formed, on its outer circumference, with a body mount flange 2b. The flange 2b mounts on a knuckle (not shown). The inner circumference of the inner member includes double row outer raceway surfaces 2a, 2a. The double row outer raceway surfaces 2a, 2a oppose the inner raceway surfaces 4a, 5a of the inner member. Similarly to the wheel hub 4, the outer member 2 is formed of medium-high carbon steel such as S53C including carbon of 0.40~0.80% by weight. At least the outer raceway surfaces 2a, 2a are hardened by high frequency induction hardening to have a surface hardness of 58~64 HRC. The double row rolling elements 3, 3 are rollably contained between the inner and outer raceway surfaces 4a, 5a and 2a, 2a, via cages 8.

A seal 9 is mounted on the outer-side opening formed between the outer member 2 and inner member 1. A protective cover 10 is mounted on the inner-side opening. The seal 9 and protective cover 10 close and seal the annular openings to prevent leakage of lubricating grease sealed within the bearing and entry of rain water or dust from the outside into the bearing.

The outer-side seal 9 is formed as an integrated seal. It includes a metal core 11 press-fit into the outer-side end of the outer member 2, via a predetermined interface. A sealing member 12 is adhered to the metal core 11, via vulcanizing adhesion. The metal core 11 is press-formed from austenitic stainless steel sheet (JIS SUS 304 etc.) or cold rolled steel sheet (JIS SPCC etc.) so as to have an L-shaped cross-section.

The sealing member 12 is formed from a synthetic rubber, such as NBR (acrylonitrile-butadiene rubber). The sealing member 12 includes a side lip 12a and a dust lip 12b inclined radially outward and in sliding contact with the inner-side base 6b, via a predetermined interference. The base 6b is a circular-arc section of the wheel mounting flange 6. A grease lip 12c is inclined toward the inner-side and is in sliding contact with the base 6b of circular arc section, via a predetermined interference.

Examples of material of the sealing member 12, other than NBR, are HNBR (hydrogenation acrylonitric-butadiene rubber), EPDM (ethylene propylene rubber), ACM (polyacrylic rubber) superior in heat and chemical resistance, FKM (fluororubber) or silicone rubber.

Although it is shown herein, the wheel bearing apparatus is formed with double row angular contact ball bearings using balls as the rolling elements 3. The present disclosure is not limited to such a bearing and may be a double row tapered roller bearing using tapered rollers as the rolling elements 3. In addition, although shown here as a third generation type wheel bearing apparatus, the present disclosure can be applied to first and second generation type bearings (not shown) where a pair of inner rings are press-fit onto the cylindrical portion of the wheel hub.

In this embodiment, a pulser ring 13 is press-fit onto the outer circumference of the inner ring 5. The pulser ring 13 includes an annular support member 14 and a magnetic encoder 15. The support member 14 has a generally annular configuration and is formed from a ferromagnetic steel plate such as ferritic stainless steel sheet (JIS SUS 430 etc.) or preserved cold rolled steel sheet, by press working, to have an L-shaped cross-section.

The annular support member 14 includes a cylindrical fitting portion 14a and an upright portion 14b. The cylindrical fitting portion 14a is press-fit onto the outer circumference of the inner ring 5. The upright portion 14b extends radially outward from the cylindrical fitting portion 14a. The magnetic encoder 15 is integrally adhered to the upright portion 14b by vulcanizing adhesion. The magnetic encoder 15 is formed from elastomer, such as rubber, with mingled ferritic magnetic powder. Thus, N and S poles are alternately arranged along its circumference to form a rotary encoder to detect the rotational speed of a wheel.

Although a pulser ring 13 is shown with the magnetic encoder 15 comprising a rubber magnet, it is possible to use other kinds of encoders such as a steel sheet pulser ring formed with a plurality of through apertures or irregularities or formed of sintered alloy to which a plastic magnet plate is adhered.

A protective cover 10 is press-fit into the inner circumference of the inner-side end of the outer member 2 to close the inner-side opening of the outer member 2. The protective cover 10 is formed from non-magnetic austenitic stainless steel sheet. It has anti-corrosion characteristic so as to not give an adverse effect on the sensing performance of a rotation speed sensor 16.

The protective cover 10 has a cup-shaped configuration. It includes a cylindrical fitting portion 10a, a disc-shaped shield portion 10b and a bottom portion 10d. The cylindrical fitting portion 10a is press-fit into the inner circumference of the inner-side end of the outer member 2. The disc-shaped shield portion 10b extends radially inward from the fitting portion 10a and opposes the magnetic encoder 15, via a small axial gap. The bottom portion 10d extends from the shield portion 10b, via a bent portion 10c, to cover the inner-side end of the inner member 1.

As shown in the enlarged view of FIG. 2, the detection portion of the rotation speed sensor 16 is arranged adjacent to or in contact with the shield portion 10b of the protective cover 10. The detection portion of the rotation speed sensor 16 and the magnetic encoder 15 oppose each other, via the protective cover 10, and with a remaining predetermined air gap (axial gap) between the two. The rotational speed sensor 16 is formed from injection moldable synthetic resin, such as PA66. An IC circuit incorporated with a Hall element, a magnetic resistance element (MR element), and a waveform shaping circuit, for shaping the output waveform of the magnetic detecting element (not shown), are embedded in the resin. This forms a portion of the ABS of an automobile to detect the rotational speed of a wheel and to enable controlling of it.

In this embodiment, the fitting portion 10a of the protective cover 10 includes a cylindrical portion 17 and a radial portion 18. The cylindrical portion 17 is in metal-contact fit with a cylindrical fitting surface 2c formed on the inner circumference of the end of the outer member 2. The radially reduced portion 18 axially extends from the cylindrical portion 17. An elastic member 19, of synthetic rubber such as NBR, is integrally adhered to the radially reduced portion 18, via vulcanizing adhesion.

The elastic member 19 is adhered to the protective cover 10 so that it does not project into the inner-side from the shield portion 10b of the protective cover 10. This prevents the elastic member 19 from interfering with the rotation speed sensor 16. The elastic member 19 includes an annular projection 19a and a contact lip 19b. The annular projection 19a projects radially outwardly from the outer circumference of the cylindrical portion 17. The contact lip 19b radially outwardly extends, with an inclination, at the inner-side of the annular projection 19a. When the protective cover 10 is fit into the outer member 2, the annular projection 19a closely contacts the fitting surface 2c while being elastically deformed. The contact lip 19b elastically contacts a chamfered portion 2d, formed on the inner-side end, of the outer member 2. This forms a so-called half metal structure. This improves the workability during the press-fitting operation. Also, it prevents the elastic member 19 from being pushed-out toward the inner-side and bulged out from the end face 2e of the outer member 2. Thus, this improves the sealability of the fitting portion 10a of the protective cover 10.

The fitting surface 2c and the chamfered portion 2d of the outer member 2 are simultaneously machined by cutting operations, such as grinding or turning operations. The fitting surface 2c and chamfered portion 2d of the outer member 2 are simultaneously ground, by a formed grinding wheel, together with the double row outer raceway surfaces 2a, 2a after heat treatment. This improves the dimensional accuracy in the roundness and coaxiality of the fitting surface 2c and the chamfered portion 2d. Thus, this reduces working steps and accordingly reduces manufacturing cost.

The protective covers are usually stacked upon each other during their manufacturing steps as shown in FIG. 3(a) to save space during stocking or during waiting for the manufacturing operation. In this embodiment, an outer diameter D1 of a tip end of the cylindrical portion 17 of the protective cover 10 is set smaller than an outer diameter D2 of a tip end of the contact lip 19b of the elastic member 19 (D1<D2) as shown in FIG. 3(b). This provides a wheel bearing apparatus that prevents the contact lip 19b of a lower stacked protective cover 10 from being damaged or cut by the tip end of the cylindrical portion 17 of an upper stacked protective cover 10 when the protective covers are stacked upon each other. Thus, this improves the workability in the manufacturing and transferring steps as well as quality reliability. It may be possible, as shown in FIG. 3(c), to reduce the diameter D1 of the tip end of the cylindrical portion 17 of the protective cover 10 to keep the tip end of the cylindrical portion 17 away from the tip end of the contact lip 19b of the elastic member 19'. Thus, the tip end of the cylindrical portion 17 can contact the root of the elastic member 19'.

FIG. 4 shows a modification of the protective cover 10 of FIG. 2. The modified protective cover 20 basically differs from the protective cover 10 only in the structure of the fitting portion. Accordingly, the same reference numerals are used to designate the same structural elements of the previously described embodiment. Thus, their detailed description will be omitted.

This protective cover 20 is press-formed of non-magnetic austenitic stainless steel sheet with a cup-shaped configuration. It comprises a cylindrical fitting portion 20a, disc-shaped shield portion 10b and bottom portion 10d. The cylindrical fitting portion 20a is press-fit into the inner circumference of the inner-side end of the outer member (not shown). The disc-shaped shield portion 10b extends radially inward from the fitting portion 20a. The bottom portion 10d extends from the shield portion 10b, via the bent portion 10c.

In this modification, the fitting portion 20a of the protective cover 20 comprises a cylindrical portion 21 to be metal-fit into the fitting surface of the outer member. The radially reduced cylindrical portion 18 axially extends from the cylindrical portion 21. An elastic member 19', formed of synthetic resin such as NBR etc., is integrally adhered to the radially reduced portion 18.

As shown in the enlarged view of FIG. 4(b), a chamfered portion 21a is formed on a tip end of the cylindrical portion 21 of the protective cover 20. The chamfered portion 21a abuts against the root of the contact lip 19b. An inclination angle of the chamfered portion 21a corresponds to and is substantially same as that of the contact lip 19b. This makes it possible to easily press-fit the protective cover into to the outer member and improves stability in the stacked state. Thus, this improves workability in manufacture of the protective cover. In this case, the wording "substantially same" means that the inclination angle of the chamfered portion 21a is simply a target value and accordingly there is substantially no difference between the inclination angles of the chamfered portion 21a and the contact lip 19b. That is, difference in angles caused by manufacturing error or tolerance should be allowed.

FIGS. 5~7 show other modifications of the protective cover 10 of FIG. 2. These modifications basically differ from the previously described protective covers only in the structure of the fitting portion. Accordingly, the same reference numerals are used to designate the same structural elements of the previously described embodiment. Thus, their detailed description will be omitted.

The protective cover 22 shown in FIG. 5(a) is press-formed from non-magnetic austenitic stainless steel sheet with a cup-shaped configuration. It comprises a cylindrical fitting portion 22a, disc-shaped shield portion 10b and bottom portion 10d. The cylindrical fitting portion 22a is press-fit into the inner circumference of the inner-side end of the outer member (not shown). The disc-shaped shield portion 10b extends radially inward from the fitting portion 22a. The bottom portion 10d extends from the shield portion 10b, via the bent portion 10c.

In this modification, the fitting portion 22a of the protective cover 22 comprises a cylindrical portion 23 that is to be metal-fit into the fitting surface of the outer member. The radially reduced cylindrical portion 18 axially extends from the cylindrical portion 23. The elastic member 19', formed of synthetic resin such as NBR etc., is integrally adhered to the radially reduced portion 18.

The enlarged view of FIG. 5(b), a chamfered portion 23a, is shown. The chamfered portion 23a has a circular arc surface on a tip end of the cylindrical portion 23 of the protective cover 22. Thus, the chamfered portion 23a can abut against the root of the contact lip 19b. This makes it possible to easily press-fit the protective cover 22 into to the outer member and prevents the contact lip 19b from being damaged or cut during stacking.

The protective cover 24 shown in FIG. 6(a) is press-formed from non-magnetic austenitic stainless steel sheet with a cup-shaped configuration. It comprises a cylindrical fitting portion 24a, disc-shaped shield portion 10b and bottom 10d. The cylindrical fitting portion 24a is to be press-fit into the inner circumference of the inner-side end of the outer member (not shown). The disc-shaped shield portion 10b extends radially inward from the fitting portion 24a. The bottom portion 10d extends from the shield portion 10b, via the bent portion 10c.

In this modification, the fitting portion 24a of the protective cover 24 comprises a cylindrical portion 25. The cylindrical portion 25 is metal-fit into the fitting surface of the outer member. The radially reduced cylindrical portion 18 axially extends from the cylindrical portion 25. The elastic member 19, formed of synthetic resin such as NBR etc., is integrally adhered to the radially reduced portion 18.

The enlarged view of FIG. 6(b) illustrates a bent edge 25a bent radially inward at a tip end of the cylindrical portion 25 of the protective cover 24. The bent edge 25a can abut against the elastic member 19 avoiding the contact lip 19b. This makes it possible to easily press-fit the protective cover 24 into to the outer member and prevents the contact lip 19b from being damaged or cut during stacking.

The protective cover 26 shown in FIG. 7(a) is press-formed from non-magnetic austenitic stainless steel sheet with a cup-shaped configuration. It comprises a cylindrical fitting portion 26a, disc-shaped portion 10b and bottom 10d. The cylindrical fitting portion 24a is press-fit into the inner circumference of the inner-side end of the outer member (not shown). The disc-shaped shield portion 10b extends radially inward from the fitting portion 26a. The bottom portion 10d extends from the shield portion 10b via the bent portion 10c.

In this modification, the fitting portion 26a of the protective cover 26 comprises a cylindrical portion 27 to be metal-fit into the fitting surface of the outer member. The radially reduced cylindrical portion 18 axially extends from the cylindrical portion 27. An elastic member 19, formed of synthetic resin such as NBR etc., is integrally adhered to the radially reduced portion 18.

As shown in the enlarged view of FIG. 7(b), the bent edge 27a is bent radially inward at a right angle from the end of the cylindrical portion 27. The end face of the bent edge 27a can abut against the elastic member 19. This makes it possible to easily press-fit the protective cover 26 into to the outer member and prevents the contact lip 19b from being damaged or cut during stacking.

FIG. 8 shows a further modification of the protective cover 10 of FIG. 2. This modification basically differs from the previously described protective covers only in the structure of the elastic member 19 of the protective cover 10. Accordingly, the same reference numerals are used to designate the same structural elements of the previously described embodiments and their detailed description will be omitted.

This protective cover 28 shown in FIG. 8(a) is press-formed from non-magnetic austenitic stainless steel sheet with a cup-shaped configuration. It comprises a cylindrical fitting portion 10a, disc-shaped shield portion 10b and bottom 10d. The cylindrical fitting portion 10a is press-fit into the inner circumference of the inner-side end of the outer member (not shown). The disc-shaped shield portion 10b extends radially inward from the fitting portion 10a. The bottom portion 10d extends from the shield portion 10b via the bent portion 10c.

In this modification, the fitting portion 10a of the protective cover 28 comprises the cylindrical portion 17 to be metal-fit into the fitting surface of the outer member. The radially reduced cylindrical portion 18 axially extends from the cylindrical portion 17. An elastic member 29, formed of synthetic resin such as NBR etc., is integrally adhered to the radially reduced portion 18.

The enlarged view of FIG. 8(b) illustrates the elastic member 29. The elastic member 29 includes an annular projection 19a and contact lip 19b. The annular projection 19a projects radially outwardly from the outer circumference of the cylindrical portion 17. The contact lip 19b radially outwardly extends, with an inclination, from the inner-side of the annular projection 19a. A cylindrical guide portion 29a is integrally formed on the elastic member 29 radially inward of the contact lip 19b. A side surface of the guide portion 29a becomes flush with a side surface of the shield portion 10b. An outer diameter D3 of the guide portion 29a is set smaller than an inner diameter D4 of the cylindrical portion 17 of the protective cover 28 (D3<D4). A guiding gap retains between the two. This improves the stability of the stacked state of the protective covers 28. Thus, the workability is improved during manufacturing since the cylindrical portion 17 of the upper protective cover 28 is radially guided by the guide portion 29a of the lower protective cover 28.

FIG. 9 shows a further modification of the protective cover 10 of FIG. 2. This modification basically differs from the previously described protective covers only in configuration of the metallic portion of the protective cover 10. Accordingly, the same reference numerals are used to designate the same structural elements of the previously described embodiments. Thus, their detailed description will be omitted.

This protective cover 30 shown in FIG. 9(a) is press-formed from non-magnetic austenitic stainless steel sheet with a cup-shaped configuration. It comprises a cylindrical fitting portion 10a, a disc-shaped shield portion 10b and a bottom portion 10d. The cylindrical fitting portion 10a is press-fit into the inner circumference of the inner-side end of the outer member (not shown). The disc-shaped shield portion 10b extends radially inward from the fitting portion 10a. A bent portion 30a is bent from the shield portion 10b at a right angle. The bottom portion 10d extends radially inward from the bent portion 30a.

In this modification, when the protective covers 30 are stacked upon each other, the protective cover 30 is formed with configurations and dimensions so that metallic portions of mutually adjacent protective covers 30 contact each other before the cylindrical portions 17 abuts against the elastic members 19. The bent portion 30a is bent from the shield portion 10b at a right angle. It is designed so that the metallic portions of the upper and lower protective covers 30 first abut each other. When the upper and lower protective covers 30 are stacked on each other (H2<H3), a height H2 of the fitting portion 10a is smaller than a height H3. H3 is the height from the shield portion 10b of the upper protective cover 30 to the side surface of the elastic member 19 of the lower protective cover 30.

The enlarged view of FIG. 9(b) illustrates a corner portion, between the bent portion 30a and the shield portion 10b of the upper protective cover 30, abutting against a corner portion, between the bottom portion 10d and the bent portion 30a of the lower protective cover 30. Accordingly, it is possible to avoid the metallic fitting portion 10a from contacting the elastic member 19. Thus, this prevents the contact lip 19b from being damaged and cut during stacking.

FIGS. 10 and 11 show modifications of the protective cover 30 of FIG. 9. The modification basically differs from the previously described protective covers only in the configuration of the metallic portion of the protective cover 30. Accordingly, the same reference numerals are used to designate the same structural elements of the previously described embodiments. Thus, the detailed description will be omitted.

The protective cover 31, shown in FIG. 10(a), is press-formed from non-magnetic austenitic stainless steel sheet with a cup-shaped configuration. It comprises a cylindrical fitting portion 10a, a disc-shaped shield portion 31a and a bottom portion 31b. The cylindrical fitting portion 10a is press-fit into the inner circumference of the inner-side end of the outer member (not shown). The disc-shaped shield portion 31a extends radially inward from the fitting portion 10a. The bent portion 30a, bent from the shield portion 31a, is at a right angle. The bottom portion 31b extends radially inward from the bent portion 30a.

Similarly to the previously described modification (FIG. 9), when the protective covers 31 are stacked upon each other, the protective cover 31, of this modification, is formed with configurations and dimensions so that metallic portions of mutually adjacent protective covers 31 contact each other before the metallic cylindrical portions 17 abuts against the elastic members 19. When the upper and lower protection covers 31 are stacked upon each other, a height H2 of the fitting portion 10a is smaller than a height H3. H3 is the height from the shield portion 31a of the upper protective cover 31 to the side surface of the elastic member 19 of the lower protective cover 31 (H2<H3).

The enlarged view of FIG. 10(b) illustrates a corner portion 32, between the bent portion 30a and the shield portion 31a, as well as a corner portion 33, between the bent portion 30a and bottom portion 31b. The corner portions 32, 33 have a tapered configuration. This causes an abutment of the corner portion 32 and the corner portion 33. The corner portion 32 is between the bent portion 30a and the shield portion 31a of the upper protective cover 31. The corner portion 33 is between the bent portion 30a and bottom portion 31b of the lower protective cover 31. Accordingly, this makes it possible to avoid the metallic cylindrical portion 17 from contacting the elastic member 19. Thus, this prevents the contact lip 19b from being damaged. Furthermore, it enables the corner portions 32 and 33 of the upper and lower protective covers 31 to surface-contacted each other. Thus, this improves the stability when stacked and workability during manufacturing steps.

A protective cover 34 shown in FIG. 11(a) is press-formed from non-magnetic austenitic stainless steel sheet with a cup-shaped configuration. It comprises a cylindrical fitting portion 10a, disc-shaped shield portion 30a, bent portion 30a and bottom portion 10d. The cylindrical fitting portion 10a is press-fit into the inner circumference of the inner-side end of the outer member (not shown). The disc-shaped shield portion 31a extends radially inward from the fitting portion 10a. The bent portion 30a is bent from the shield portion 31a at a right angle. A radially reduced cylindrical portion 34b axially extends from the bent portion 30a, via a tapered stepped portion 34a. The bottom portion 10d extends radially inward from the radially reduced portion 34a.

Similarly to the previous embodiment of FIG. 10, the protective cover 34 is formed with configurations and dimensions so that metallic portions of mutually adjacent protective covers 34 contact each other before the metallic cylindrical portions 17 abut against the elastic members 19 when the protective covers 34 are stacked upon each other. When the protective covers 34 are stacked, an outer diameter D5 of the radially reduced portion 34b is smaller than an inner diameter D6 of the bent portion 30a with a small radial gap therebetween (D5<D6). This enable the bent portion 30a of the upper protective cover 34 to fit over the radially reduced portion 34b of the lower protective cover 34. A height H2 of the fitting portion 10a is smaller than a height H3. H3 is the height from the shield portion 31a of the upper protective cover 34 to the side surface of the elastic member 19 of the lower protective cover 34 (H2<H3).

Accordingly, the corner portion 32, between the bent portion 30a and the shield portion 31a of the upper protective cover 34, contacts the stepped portion 34a of the lower protective cover 34. This makes it possible to avoid the metallic cylindrical portion 17 from contacting the elastic member 19. Thus, this prevents the contact lip 19b from being damaged. Furthermore, it enables the corner portion 32 and the stepped portion 34a of the upper and lower protective covers 34, respectively, to surface-contact each other. Thus, this improves the stability when stacked and workability during manufacturing steps.

The wheel bearing apparatus of the present disclosure can be applied to any wheel bearing apparatus for a driven wheel of the inner ring rotation type with a protective cover on an outer member. The wheel bearing apparatus utilizes balls or tapered rollers as its rolling elements.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A wheel bearing apparatus comprising:
    an outer member integrally formed with double row outer raceway surfaces on its inner circumference;
    an inner member including a wheel hub and at least one inner ring, the wheel hub being integrally formed on one end with a wheel mounting flange, a cylindrical portion axially extends from the wheel mounting flange, the inner ring is press fit onto the cylindrical portion of the wheel hub, the inner member is formed, on its outer circumferences, with double row inner raceway surfaces opposite to the double row outer raceway surfaces;
    double row rolling elements are contained between the outer raceway surfaces and inner raceway surfaces, respectively, of the outer member and the inner member;
    a cup-shaped steel protective cover is mounted on the inner-side end of the outer member, the protective cover comprising a cylindrical fitting portion, disc-shaped shield portion and bottom portion, the cylindrical fitting portion is press-fit into the inner circumference of the inner-side end of the outer member, the disc-shaped shield portion extends radially inward from the fitting portion, the bottom portion extends from the shield portion, via a bent portion, to cover the inner-side end of the inner member;
    the fitting portion of the protective cover comprises a cylindrical portion and a radially reduced portion, the cylindrical portion fits into a cylindrical fitting surface formed on the inner circumference of the end of the outer member, the radially reduced portion axially extends from the cylindrical portion;
    an elastic member of synthetic rubber is integrally adhered to the radially reduced portion, the elastic member comprising an annular projection and a contact lip, the annular projection projects radially outwardly from the outer circumference of the cylindrical portion, the contact lip radially outwardly extends, with an inclination, at the inner-side of the annular projection; and
    when the protective cover is fit into the outer member, the annular projection closely contacts with the fitting surface while being elastically deformed, and the contact lip elastically contacts the inner-side end of the outer member.

2. The wheel bearing apparatus of claim 1, wherein a pulser ring with alternately changed magnetic characteristics along its circumferential direction is fit onto the inner ring and the protective cover is formed from non-magnetic steel sheet and a rotational speed sensor is arranged opposite to the pulser ring separated by an axial air gap via the protective cover.

3. The wheel bearing apparatus of claim 1, wherein an outer diameter of a tip end of the cylindrical portion of the protective cover is set smaller than an outer diameter of a tip end of the contact lip of the elastic member.

4. The wheel bearing apparatus of claim 1, wherein a chamfered portion, with an inclined flat surface, is formed on a tip end of the cylindrical portion of the protective cover and an inclination angle of the chamfered portion corresponds to that of the contact lip.

5. The wheel bearing apparatus of claim 1, wherein a chamfered portion, with a circular arc surface, is formed on a tip end of the cylindrical portion of the protective cover.

6. The wheel bearing apparatus of claim 1, wherein a bent edge, bent radially inward, is formed on a tip end of the cylindrical portion of the protective cover.

7. The wheel bearing apparatus of claim 1, wherein a cylindrical guide portion is integrally formed on the elastic member radially inward of the contact lip and an outer diameter of the guide portion is set smaller than an inner diameter of the cylindrical portion of the protective cover forming a guiding gap.

8. The wheel bearing apparatus of claim 1, wherein the bent portion is formed at a right angle relative to the shield portion and the protective cover is formed with configurations and dimensions so that metallic portions of mutually adjacent protective covers contact each other before the cylindrical portions abut against the elastic members when the protective covers are stacked upon each other.

9. The wheel bearing apparatus of claim 8, wherein the protective cover comprises a smaller cylindrical portion, axially extending from the bent portion via a taper-shaped stepped portion, having a diameter smaller than that of the bent portion.

* * * * *